Aug. 19, 1958 E. M. CREAMER, JR., ET AL 2,848,531

VIDEO SIGNAL MODULATION OF PILOT CARRIER BEAM

Filed June 3, 1954

INVENTORS
EDGAR M. CREAMER JR.
MELVIN E. PARTIN
BY
Allen V. Hawkins
ATTORNEY

United States Patent Office 2,848,531

Patented Aug. 19, 1958

2,848,531

VIDEO SIGNAL MODULATION OF PILOT CARRIER BEAM

Edgar M. Creamer, Jr., and Melvin E. Partin, Philadelphia, Pa., assignors to Philco Corporation, Philadelphia, Pa., a corporation of Pennsylvania Application June 3, 1954, Serial No. 434,302

12 Claims. (Cl. 178—5.4)

Figures 1, 2:
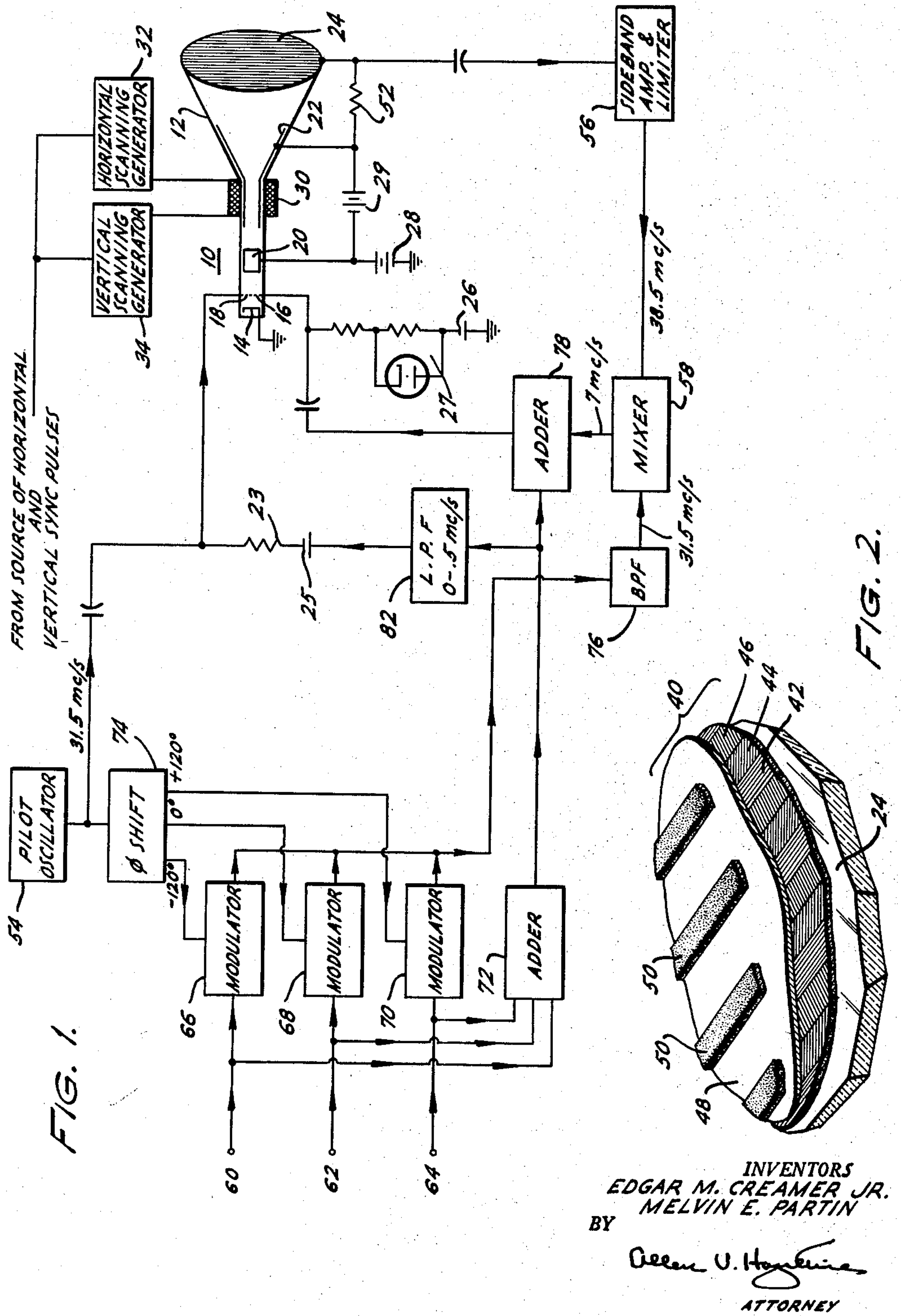

The present invention relates to electrical systems and more particularly to cathode ray tube systems comprising a beam intercepting member and indexing elements arranged in cooperative relationship with the beam intercepting member and adapted to produce a signal indicative of the position of the cathode ray beam relative to the beam intercepting member.

The invention is particularly adapted for use in connection with a color television image presentation system utilizing a single cathode ray tube having a beam intercepting, image forming screen member comprising stripes of luminescent materials. These stripes are preferably arranged in laterally-displaced color triplets, each triplet comprising three phosphor stripes which respond to electron impingement to produce light of the different primary colors. The stripes may be arranged vertically and the order thereof may be such that the normally horizontally-scanning cathode ray beam produces red, green and blue light successively. Alternatively the stripes may be arranged horizontally and the normal horizontal scanning pattern of the cathode ray beam may be modified by imparting an auxiliary vertical deflection thereto so that, during each line scansion of the beam, the beam successively impinges the different phosphor stripes of a color triplet. From a color television receiver there may then be supplied a color video wave which, at consecutive time intervals, is indicative of a different primary color component of a televised scene, and which is utilized to control the intensity of the cathode ray beam.

Such a color video wave may be produced at the receiver by sequentially sampling three separate video signals, each indicative of a different primary color component of a televised scene. Alternatively a color video wave conforming to the present standards of color picture transmission may be modified at the receiver as disclosed and claimed in the copending application of Stephen W. Moulton et al., Serial No. 323,234 filed November 29, 1952, so that its characteristics conform to the particular real primary colors of the phosphors utilized in the image screen of the tube and to the particular geometric distribution of the phosphor stripes of the image screen.

Whether the color video wave applied to the beam intensity control electrode of the image tube is produced by a sequential sampling operation or by modifying the signal transmitted in accordance with present standards, in each instance it comprises a first component of relatively wide bandwidth defining the brightness of the consecutively scanned image elements, and further comprises a second component in the form of a modulated subcarrier arranged at one end of the frequency spectrum of the first component and defining, with the first component, the chromaticity of the image elements. This subcarrier component effectively comprises three carrier signals of the same frequency, each individually amplitude modulated in accordance with the color information pertaining to a different primary color aspect of the image to be reproduced. The relative phases of the three color carrier signals corresponds to the relative positions of the phosphor stripes forming the color triplets and, when the phosphor stripes of each color triplet are uniformly spaced apart in a repetitive sequence and the beam scans the stripes consecutively, the three color carrier signals are displaced 120° relative to each other. In a typical case, the first component of the video wave may have a frequency spectrum extending from 0 to 3 mc./sec. and the color subcarrier component may have a frequency of approximately 7 mc./sec. such as would be required by an image tube in which the rate of scanning the consecutive color triplets is 7 million per second as determined by the number of color triplets and the rate of scanning the same.

The instantaneous amplitude of this color video wave is a function of the magnitude of the components thereof and of the absolute phase position of the modulated subcarrier component thereof, and at any given instant the amplitude is indicative of the intensity of one of the primary color constituents of an element of the image to be reproduced. For proper color rendition, it is required that, as the phosphor stripes producing each of the primary colors of light are impinged by the cathode ray beam, the intensity of the beam be simultaneously controlled in response to the contemporaneous value of the video wave representing the corresponding color component of the televised image. However, in practice the rate at which the beam scans across the phosphor stripes of the screen may vary because of non-linearities of the beam deflecting signal or because of a non-uniform distribution of the color triplets on the screen surface. In order to maintain a synchronous relationship between the contemporaneous value of the video wave and the position of the beam there may be derived from the image screen an indexing signal indicative of the position of the beam, which signal may be used to control the relationship between the phase of the video wave and the position of the beam. Such an indexing signal may be used to vary the time phase position of the video wave and/or to vary the scanning rate of the beam as determined by variations of the indexing signal.

The said indexing signal may be derived from a plurality of stripe regions arranged on the beam intercepting screen structure so as to be indicative of the location of the color triplets. Thus the indexing regions may be superimposed on phosphor stripes of a given color in each of the color triplets or may be arranged in the spaces between consecutive triplets. When the beam scans the screen, the indexing regions are excited in spaced time sequence relative to the scanning of the color triplets and a signal precisely indicative of the beam position is generated in a suitable output electrode system of the cathode ray tube.

The indexing regions may comprise a material having secondary-emissive properties which differ detectably from the secondary-emissive properties of the remaining portions of the beam intercepting structure. For example, the indexing regions may consist of certain oxides such as magnesium oxide or may consist of a high atomic number material such as gold, platinum or tungsten, and the remainder of the beam intercepting structure may be provided with a coating of a material having a detectably different secondary-emissive ratio, such as aluminum, which coating may also serve as a light reflecting mirror for the phosphor stripes in accordance with well known practice. With such an arrangement the indexing signals may be derived from an electrode cooperatively coupled to the screen structure. Alternatively the indexing stripes may consist of a fluorescent material, such as zinc oxide, having a spectral output in the non-visible light region and the indexing signals may be derived from a suitable photo-electric cell arranged, for example, in a side wall portion of the cathode ray tube out of the path of the cathode ray beam and facing the beam intercepting surface of the screen structure.

In the copending application of Melvin E. Partin, Serial No. 242,264, filed August 17, 1951, there has been described a cathode ray tube system in which the phosphor stripes constituting the image screen and the indexing regions thereof are simultaneously scanned by two electron beams which move in synchronism across the surface of the image screen. One of the electron beams serves to energize the phosphor stripes, and for this purpose the beam is intensity modulated by the color video wave. The second beam serves to produce indexing information indicative of the position of the first beam, and for this purpose the beam is intensity modulated at a pilot carrier rate. The so modulated second beam produces, at an output electrode system of the cathode ray tube, signal components which represent modulation products as determined by the intensity variations of the second beam and the rate of scanning the indexing regions. When the intensity of the second beam is modulated at a pilot carrier rate which is widely different from the rate at which the first beam is varied by the video wave, the indexing information produced by the second beam may be derived substantially free from contaminating components normally produced by the presence of video modulation within the cathode ray tube system. The pilot carrier modulation products so produced consist essentially of a carrier wave at the pilot carrier frequency and sideband signals representing the sum and difference of the pilot carrier frequency and the rate of scanning the indexing regions. Since changes in the rate of scanning the consecutive indexing regions are indicated by a change in the frequencies of the sideband signals, one of these sideband signals may be used as an indexing signal and this sideband signal may be selectively derived from the screen structure by means of an appropriate signal filter system embodied within the processing channel for the indexing signal.

As a rule, in order to avoid desaturation of the colors of the image produced by the video wave modulated beam, the indexing signal producing beam is operated at a relatively low intensity value. Under these conditions the indexing signal produced is a low intensity signal. It has been found, in some instances, that spurious signals may appear in the indexing signal circuits and thereby contaminate the low intensity indexing signal to an undesirable extent. These spurious signals may comprise harmonics of the video wave which are normally produced by the non-linear characteristic of the image producing beam generating and control system, and which have frequency components of significantly high intensity within the pass band of the indexing signal processing channel, when the intensity of the video wave modulating the image producing beam is high. In addition it has been found that the normal impingement of an electron beam on the target materials produces noise signal components. Some of these noise signal components have frequencies falling directly within the bandpass region of the indexing signal processing circuits, whereas others of these noise components are converted into signals having frequencies within the pass band of the indexing signal circuits by the heterodyning action between the noise components and the video wave components which takes place at the screen surface.

It is an object of the invention to provide an improved cathode ray tube system of the type in which the position of a cathode ray beam is indicated by a signal produced by an indexing component of the screen structure.

Another object of the invention is to provide improved cathode ray tube systems of the foregoing type in which an indexing signal is produced which, at all times, has a level sufficient to make the indexing signal readily distinguishable from contaminating signal components which also may be supplied to the indexing signal processing channel.

A specific object of the invention is to provide a color television image reproducing cathode ray tube system in which an indexing signal, indicative of the position of an image producing beam, is produced at a level sufficient to identify clearly the indexing signal without producing significant desaturation of the colors of the image.

These and further objects of the invention will appear as the specification progresses.

In accordance with the invention, in a cathode ray tube system having first and second beam generating systems and a common beam intercepting structure comprising first portions adapted to produce a first given intelligence response upon impingement by said first beam and comprising second portions adapted to produce a second response detectably different from the response of the first portions upon impingement by said second beam, thereby to generate indexing information indicative of the position of the said first beam energizing said first portions, the foregoing objects are achieved by varying the intensity of said second beam in accordance with the intelligence information serving to vary the intensity of the first beam. More specifically, and in a preferred embodiment of the invention, wherein the cathode ray tube comprises an image forming screen having consecutively arranged stripes of fluorescent material and indexing regions arranged in a configuration indicative of the position of the fluorescent stripes and further comprises an image reproducing beam and an indexing beam adapted to scan the image screen in synchronism, the foregoing objects are achieved by varying the intensity of the indexing beam in accordance with the intensity variations of the low frequency components of the video information serving to modulate the image reproducing beam.

The invention will be described in greater detail with reference to the appended drawing forming part of the specification and in which:

Figure 1 is a block diagram, partly schematic, showing one form of a cathode ray tube system embodying the invention; and Figure 2 is a perspective view of a part of one form of an image reproducing screen structure suitable for the cathode ray tube system of Figure 1.

Referring to Figure 1, the cathode ray tube system there shown comprises a cathode ray tube 10 containing, within an evacuated envelope 12, a dual beam generating and intensity control system comprising a cathode 14, control electrodes 16 and 18, a focusing anode 20 and an accelerating anode 22, the latter of which may consist of a conductive coating on the inner wall of the envelope and terminates at a point spaced from the end face 24 of the tube in conformity with well established practice. Suitable forms of construction for the dual beam generating system have been described in the aforementioned copending application of Melvin E. Partin and a further description thereof herein is believed to be unnecessary. Electrode 16 is maintained at the desired operating potential by means of a suitable bias voltage source, shown as a battery 26, and a D. C. restorer system 27 of conventional form. Electrode 18 is maintained at its operating potential by means of a bias voltage source, shown as a battery 25, the negative pole of which is connected to the electrode 18 through a decoupling resistor 23 and the positive pole of which is connected to a point at ground potential through a low pass filter 82 to be referred to later. For energizing the electrodes 20 and 22, there may be provided suitable voltage sources shown as batteries 28 and 29, the battery 28 having its positive pole connected to the anode 20 and its negative pole connected to a point at ground potential, and the battery 29 being connected with its positive pole to electrode 22 and its negative pole to the positive pole of battery 28. A deflection yoke 30 coupled to horizontal and vertical deflection signal generators 32 and 34 respectively, of conventional design, is provided for deflecting dual electron beams across the faceplate 24 of the tube to form a raster thereon.

The end faceplate 24 of the tube 10 is provided with a beam intercepting structure 40, one suitable form of which is shown in Figure 2. In the arrangement shown in Figure 2, the structure 40 is formed directly on the faceplate 24. However, it should be well understood that the structure 40 may be formed on a suitable light transparent base which is independent of the faceplate and may be spaced therefrom. Superimposed on the faceplate 24 are a plurality of parallelly arranged stripes 42, 44 and 46 of phosphor materials which, upon impingement of a cathode ray beam, fluoresce to produce light of three different primary colors. For example, the stripes 42 may consist of a phosphor such as zinc phosphate containing manganese as an activator, which upon electron impingement produces red light, the stripes 44 may consist of a phosphor such as zinc orthosilicate, which produces green light, and the stripes 46 may consist of a phosphor such as calcium magnesium silicate containing titanium as an activator, which produces blue light. Other suitable materials which may be used to form the phosphor stripes 42, 44 and 46 are well known to those skilled in the art, as well as methods of applying the same to the faceplate 24, and further details concerning the same are believed to be unnecessary. Each of the groups of stripes may be termed a color triplet, and the sequence of the stripes is repeated in consecutive order over the area of the structure 40.

In the arrangement specifically shown, the indexing signal is produced by indexing stripes of a given secondary-electron emissive ratio differing from the secondary-electron emissive ratio of the remainder of the beam intercepting structure. For this purpose the structure 40 further comprises a thin electron permeable electrically conductive layer 48 of relatively low secondary-electron emissivity. The layer 48 is arranged on the phosphor stripes 42, 44 and 46 and preferably further constitutes a mirror reflecting light generated by the phosphor stripes. In practice the layer 48 is a light reflecting aluminum coating which is formed in well known manner. Other materials capable of forming a coating in the manner similar to aluminum, and having a secondary-electron emission ratio detectably different from that of the material of the indexing stripes, may also be used. Such other metals may be, for example, magnesium or beryllium.

Arranged on the coating 48, over consecutive green stripes 44, are indexing stripes 50 consisting of a material having a secondary-electron emission ratio detectably different from that of the material of the coating 48. The stripes 50 may consist of an oxide such as magnesium oxide, or may consist of gold or of other high atomic number metals such as platinum or tungsten.

The beam intercepting structure so constituted is connected to the positive pole of the battery 29 through a load impedance 52 (see Figure 1) by means of a suitable lead attached to the conductive coating 48 thereof.

Since the dual cathode ray beams are deflected by the common deflection yoke 30, they simultaneously scan the beam intercepting structure 40, and indexing information derived from one of the beams may be used to establish the position of the other beam. When, in accordance with the principles set forth in the aforementioned Partin application, one of the beams, such as the beam under the control of the electrode 18, is varied in intensity at a pilot frequency, for example by means of a pilot carrier signal derived from a pilot oscillator 54, the so-varied beam generates across the load resistor 52 an indexing signal comprising a carrier component at the pilot frequency and sideband components representing the sum and difference frequencies of the pilot frequency and the rate at which the indexing stripes 50 are scanned by the beam.

In a typical case, the pilot frequency variations of the intensity of the beam may occur at a nominal frequency of 31.5 mc./sec. and, when the rate of scanning the indexing region 50 (see Figure 2) is nominally 7 million per second as determined by the horizontal scanning rate and by the number of indexing stripes 50 impinged per scanning period, a modulated signal having a nominal frequency of 31.5 mc./sec. and having lower and upper sideband components nominally at 24.5 mc./sec. and 38.5 mc./sec. respectively, is produced across the load resistor 52. Changes in the rate of scanning the indexing regions, due to non-linearities of the beam deflection system and/or due to non-uniformities of the spacing of the indexing regions, produce corresponding changes in the frequencies of the sideband components about their respective nominal values so that one of the sidebands may be used as the source of desired indexing information.

In the arrangement specifically shown in Figure 1, the upper sideband component at approximately 38.5 mc./sec. is used for supplying the desired indexing information and this sideband component is preferentially selected from other components of different frequency which are generated across the load impedance 52 by means of a sideband amplifier 56 having a restricted pass band characteristic centered about this nominal frequency value and applied to a utilization circuit therefor consisting of a mixer 58. Amplifier 56 may be of conventional form and may be made to exhibit a restricted pass band characteristic in any well known manner, for example by means of a resonant circuit broadly tuned to the nominal frequency of the desired sidebands or by means of an equivalent filter system. The amplifier may embody conventional amplitude limiting means by which any amplitude modulation appearing on the signal may be removed and may be adapted to provide the desired amplification without phase distortion of the applied signal.

Mixer 58 may be of conventional form and may consist of a dual grid thermionic tube, to the different grids of which the two input signals are supplied, and may further comprise an output circuit broadly tuned to the frequency of the desired heterodyne frequency signal, nominally at the frequency of 7 mc./sec.

For the reproduction of a color image on the face plate of the cathode ray tube, there are provided color signal input terminals 60, 62 and 64 which are supplied from a television receiver with separate signals indicative of the red, green and blue components of the televised scene, respectively. The system then operates to convert these three color signals into a wave having the color information arranged in time reference sequence so that the red information occurs when the cathode ray beam under the control of electrode 16 impinges the red stripe 42 of the beam intercepting structure 40, the green information occurs upon impingement of the green stripe 44 and the blue information occurs when the blue stripe 46 is impinged.

The conversion of the color signals into a wave having the color information arranged in time reference sequence may be achieved by means of a modulation system suitably energized by the respective color signals and by appropriately phase-related actuating signals. In the arrangement specifically shown, the desired conversion is effected by means of sine wave modulators 66, 68 and 70 in conjunction with an adder 72. Modulators 66, 68 and 70 may be of conventional form and may each consist, for example, of a dual grid thermionic tube, to one grid of which is applied the color signal from the respective terminals 60, 62 and 64, and to the other grid of which is applied an actuating signal. The adder 72 may be constructed in well known manner and may consist of three thermionic tubes having their input grids individually connected to the different terminals 60, 62 and 64 and having their anodes connected together and supplied through a common load impedance.

The actuating signals are derived from the pilot oscillator 54 through a phase shifter 74, the latter being adapted to produce, by means of suitable phase shifting networks, three actuating voltages appropriately phase displaced. In the arrangement specifically described, wherein the phosphor stripes 42, 44 and 46 (see Figure 2) are uniformly distributed throughout the width of each color triplet, the voltages from the phase shifter 74 bear a 120° phase relationship as shown.

The individual waves produced at the outputs of the modulators will be sine waves, each amplitude modulated by the color signal applied to the respective modulators, and each having a phase relationship determined by the particular actuating signal applied. The three modulators are coupled with their outputs in common, whereby the three waves are combined to produce a resultant wave having a frequency at the frequency of the oscillator 54 and having amplitude and phase variations proportional to the relative amplitudes of the color signals. A band pass filter 76, having a central frequency as determined by the frequency of the actuating signals applied to the modulators, may be arranged in the common output of the modulators to suppress undesirable modulation components. Alternatively, as hereinbefore mentioned, the desired resultant signal may be produced from the received signal by heterodyne techniques in the manner described in application Serial No. 214,995, filed March 10, 1951, of Robert C. Moore, modified as described in the forementioned application of Stephen W. Moulton et al., or by other equivalent means.

The resultant wave at the output circuit of band pass filter 76 is applied to the mixer 58 together with the indexing signal derived from the amplifier and limiter 56 to produce a heterodyne difference signal having amplitude and phase variations as determined by the relative amplitudes of the color signals at the terminals 60, 62 and 64, and having further phase, and/or frequency, variations as determined by the variations in the rate of scanning the index stripes of the beam intercepting structure of the cathode ray tube. It will be noted that since the variations of the intensity of the cathode ray beam under the control of electrode 18 and the modulation of the color signals at terminals 60, 62 and 64 are at the same frequency, the heterodyne difference signal produced by mixer 58 will have a nominal frequency equal to the average rate of scanning the index stripes so that each successive color triplet of the structure 40 will be energized by successive cycles of the said difference frequency signal.

Each of the color signals supplied to the input terminals of modulators 66, 68 and 70 will, in general, include a reference level component definitive of brightness. While each of the modulators may be constructed so as to transmit this reference level component, in practice this is generally not done. Preferably the three color signals are combined in proper proportions in the adder 72 to yield a signal representative of the overall brightness of the image elements to be reproduced and this signal is in turn combined with the color signal produced at the output of the mixer 58 by means of an adder 78. Adder 78 may be similar in construction to the adder 72.

The video wave produced at the common output of the adder 76 and applied to the beam intensity control electrode 16 thus comprises a reference level component establishing the brightness of the image elements to be reproduced and a modulated component establishing the chromaticity of the image elements. In a typical case the brightness component may have a frequency spectrum extending from 0 to 3.5 mc./sec. and the chromaticity component may have a frequency of 7 mc./sec. as above pointed out.

As pointed out above, it has been the practice to operate the indexing signal producing beam under the control of electrode 18 at a relatively low intensity value, thereby to avoid undesirable desaturation of colors of the image elements which would otherwise be produced by the indexing beam. Under these conditions an indexing signal having a relatively low intensity value is produced across the load impedance 52. In the absence of secondary influences, this signal is sufficiently well defined that it may be amplified by the amplifier 56 to an appropriate intensity to achieve the desired synchronous relationship between the phase of the chromaticity information and the position of the image producing beam of the tube 10.

However, in some instances there may be produced within the tube system spurious signals having frequency components within the pass band of the indexing signal processing circuits so that the low intensity indexing signal is no longer clearly defined. In one instance these spurious signals may be brought about by the non-linearity of the beam-current versus control-voltage characteristic of the image beam generating system of the cathode ray tube and consist of harmonics of the chrominance component of the color video wave having frequency values within the pass band of the indexing signal processing circuit. In addition, it has been found that the image screen structure itself is a source of noise signals. The intensity of these noise signals is determined by the intensity of the impinging beam, by the particle sizes of the materials constituting the screen, by the method by which the screen is made, and by other factors which cannot readily be evaluated. This screen noise has essentially a continuous frequency spectrum so that there will be components thereof which fall within the pass band of the side-band amplifier 56. Spurious signals having frequency components within the pass band of amplifier 56 also may be produced as heterodyne beats between harmonics of the components of the video signal modulation of the image producing beam, the noise signals generated by the screen and the low frequency component signal generated by the scanning of the indexing stripes.

When the intensity of the color video wave applied to the image tube is high these spurious components may be sufficiently intense so as to have values of the order of the intensity of the generated indexing signal, thereby seriously impairing the quality of the indexing signal.

In accordance with the invention, in order to maintain a large ratio between the intensity of the generated indexing signal and the intensity of spurious signals which may appear in the indexing signal circuits, the intensity of the indexing beam, and hence the intensity of the generated indexing signal, is made dependent on the intensity of the color video wave supplied to the image tube, or made dependent on the intensity of a selected component of the color video wave. More specifically, and as shown in Figure 1, the color video wave supplied to the control electrode 16 is simultaneously supplied to the electrode 18 which serves to control the intensity of the indexing beam of the tube 10. It is thus seen that electrode 18 is supplied with a pilot carrier signal from the oscillator 54 and a video signal from the adder 72.

Normally the beam intensity control system for the indexing beam exhibits a non-linear beam-current versus control-voltage characteristic so that harmonics of the applied signals are generated in the operation of the system. In accordance with the preferred embodiment of the invention, only the low frequency components of the video signal are applied to the control electrode 18, thereby to minimize the possibility of generating harmonics of the video signal having frequencies within the pass band of the sideband amplifier 56. For this purpose there is provided, in the video signal path to the electrode 18, a low pass filter 82 which typically has a cut-off frequency of .5 mc./sec. as shown. Filter 82 may be conventional in form and may consist of a four terminal network having a D. C. return to ground potential, thereby providing a D. C. return for the bias battery 25.

In practice, the indexing beam control electrode 18 is normally biased at or beyond its cut-off potential by means of the bias voltage source 27, so that the pilot carrier signal from oscillator 54 causes the beam current to flow in pulses having a duration of approximately 180° or less. By adjusting the value of the biasing potential and the intensity of the pilot carrier signal the intensity of the indexing beam may be established at a value at which a clearly distinguishable indexing signal is produced without producing objectionable desaturation of the image colors when the image has a low intensity value. By applying the low frequency component of the video wave to the control electrode 18, as shown in Figure 1, the intensity of the indexing beam is additionally varied as a function of the intensity of the selected low frequency component. Accordingly, whenever the color video wave applied to control electrode 16 has a value at which noticeable spurious components are produced in the indexing signal circuits, the indexing signal produced across the load impedance 52 is correspondingly increased in value so that the generated indexing signal always remains clearly distinguishable from the spurious signals.

While the increase of the intensity of the indexing beam would normally tend to desaturate the image, it has been found that no visually objectionable effects are produced because of the concurrent increase of the brightness of the image brought about by the greater image signal which is applied to control electrode 16 at these times.

It will be recognized that varying the indexing beam intensity as a function of the intensity of the video signal, as above described, is analogous to amplitude modulating the pilot carrier signal applied to the control electrode 18. Accordingly, the same effects may be produced by separately modulating the pilot carrier signal by means of the selected component of the video signal and thereafter applying the so modulated signal to the control electrode 18. In such an alternative arrangement there may be provided a modulator of conventional form having its inputs supplied by the pilot oscillator 54 and the low pass filter 82 and having its output connected to the control electrode 18. The use of this alternative may be indicated in those instances in which it is desired to operate the indexing beam control system under linear or so-called class A conditions.

While we have described our invention by means of specific examples and in a specific embodiment we do not wish to be limited thereto for obvious modifications will occur to those skilled in the art without departing from the spirit and scope of the invention.

What we claim is:

1. A cathode ray tube system comprising a cathode ray tube having an electron beam intercepting member, means for generating a plurality of electron beams and means for independently controlling the intensities of said beams, said beam intercepting member having first portions thereof arranged in a given geometric configuration and having a first given response characteristic upon electron impingement, said intercepting member further having second portions thereof arranged in a second geometric configuration indicative of said first configuration and having a second given response characteristic upon electron impingement detectably different from said first characteristic, means for scanning said beams in synchronism across said beam intercepting member thereby to energize said first and second portions, a source of a signal wave having variations indicative of desired variations of the response of said first portions, means for applying said signal wave to the intensity control means of a first of said beams, means for energizing the intensity control means of a second of said beams thereby to control the intensity of said second beam, means for additionally applying at least a portion of said signal wave to the intensity control means of said second beam thereby to vary the intensity of said second beam in response to said applied portion of said signal wave, and means for deriving from said second portions a control quantity having variations determined by variations of the resultant intensity of said second beam.

2. A cathode ray tube system as claimed in claim 1 wherein said signal wave has low and high frequency components and wherein said means for additionally applying at least a portion of said signal wave to the intensity control means of said second beam comprises means for selectively applying one of said components to the intensity control means of said second beam.

3. A cathode ray tube system as claimed in claim 2 wherein said means for additionally applying at least a portion of said signal wave to the intensity control means of said second beam comprises means for selectively applying the low frequency components of said signal wave to the intensity control means of said second beam.

4. A cathode ray tube system as claimed in claim 1 wherein said means for energizing the intensity control means of said second beam comprises a source of a cyclically varying signal and means for applying said signal to said last-mentioned intensity control means.

5. A cathode ray tube system as claimed in claim 4 wherein said signal wave has a frequency spectrum extending to a maximum given frequency value and wherein said source of a cyclically varying signal comprises means for producing an oscillation signal having a frequency greater than said maximum frequency value.

6. A cathode ray tube system as claimed in claim 4 wherein said signal wave is a signal having low and high frequency components and wherein said means for additionally applying at least a portion of said signal wave to said second intensity control means comprises a low pass filter system adapted to selectively apply the said low frequency components of said applied portion of said signal wave to the said second intensity control means.

7. A cathode ray tube system for producing a color television image comprising a cathode ray tube having an electron beam intercepting member, means for generating a plurality of electron beams and means for independently controlling the intensities of said beams, said beam intercepting member comprising consecutively arranged first portions each comprising a plurality of stripes of fluorescent material, said stripes producing light of different colors in response to electron impingement, said beam intercepting member further comprising second portions spaced apart and arranged substantially parallel to said first strips in a geometric configuration indicative of the position of said color strips and comprising a material adapted to produce a response upon electron impingement detectably different from the response of said first portions, means for scanning said beams in synchronism across said beam intercepting member thereby to energize said first and second portions, a source of a color video wave having variations indicative of desired variations of the response of said color stripes, means for applying said video wave to the intensity control means of a first of said beams, means for energizing the intensity control means of a second of said beams thereby to control the intensity of said second beam, means for additionally applying at least a portion of said video wave to said second beam control means thereby to vary the intensity of said second beam in accordance with variations of said video wave, and means for deriving from said second portions a control quantity having variations determined by variations of the resultant intensity of said second beam.

8. A cathode ray tube system as claimed in claim 7 wherein said color video wave comprises a low frequency component and a high frequency component and wherein said means for additionally applying at least a portion of said video wave to the control means of said second beam comprises means for selectively applying said low frequency component to said second beam control means.

9. A cathode ray tube system as claimed in claim 7 further comprising means responsive to said control quantity for controlling the relationship between the phase of said color video wave and the position of said first beam on said beam intercepting member.

10. A cathode ray tube system as claimed in claim 7 wherein said color video wave has a frequency spectrum extending to a given maximum frequency value and wherein said means energizing the said second beam control means comprises a source of a cyclically varying signal having a frequency greater than said maximum frequency value and means for applying said signal to said second beam control means.

11. A cathode ray tube system for producing a color television image comprising a cathode ray tube having an electron beam intercepting member, means for generating a plurality of electron beams and means for independently controlling the intensities of said beams, said beam intercepting member comprising consecutively arranged first portions each comprising a plurality of stripes of fluorescent material, said stripes producing light of different colors in response to electron impingement, said beam intercepting member further comprising second portions spaced apart and arranged substantially parallel to said first stripes in a geometric configuration indicative of the position of said color stripes and comprising a material adapted to produce a response upon electron impingement detectably different from the response of said first portions, means for scanning said beams in synchronism across said beam intercepting member therby to energize said first portions and said second portions in succession, a source of a color video wave comprising a first signal component having a frequency spectrum extending to a given maximum frequency value and having a second signal component in the form of a modulated subcarrier wave having a nominal frequency substantially equal to the rate of scanning successive groups of said color stripes, means for applying said video wave to the intensity control means of a first of said beams, means for producing a cyclically varying signal having a frequency greater than the nominal frequency of said subcarrier component, means for applying said cyclically varying signal to the intensity control means of a second of said beams thereby to modulate the intensity of said second beam at a rate equal to the frequency of said signal, means for deriving from said first component of said color video wave selected low frequency components thereof, means for applying said selected low frequency components to said second beam control means thereby to vary the intensity modulation of said second beam in accordance with variations of the intensity of said selected low frequency components, and means for deriving from said second portions a control quantity having variations as determined by the resultant intensity variations of said second beam and by the rate of scanning across said second portions.

12. A cathode ray tube system as claimed in claim 11 wherein said means for deriving said control quantity comprises a signal transmission channel coupled to said beam intercepting member and adapted to selectively derive from said intercepting member a component signal having a nominal frequency determined by the frequency of said cyclically varying signal and by the rate of scanning across said successive second portions, and further comprising means responsive to said component signal for controlling the relationship between the phase of said subcarrier component of said color video wave and the position of said first beam on said beam intercepting member.

References Cited in the file of this patent

UNITED STATES PATENTS

| | | |
|---|---|---|
| 2,621,244 | Landon | Dec. 9, 1952 |
| 2,674,651 | Creamer | Apr. 6, 1954 |